(12) United States Patent
Ozaki

(10) Patent No.: US 11,158,268 B2
(45) Date of Patent: Oct. 26, 2021

(54) DISPLAY DEVICE

(71) Applicant: Japan Display Inc., Minato-ku (JP)

(72) Inventor: Tadafumi Ozaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/923,223

(22) Filed: Jul. 8, 2020

(65) Prior Publication Data

US 2021/0012726 A1 Jan. 14, 2021

(30) Foreign Application Priority Data

Jul. 10, 2019 (JP) .............................. JP2019-128616

(51) Int. Cl.
*G09G 3/34* (2006.01)
*G09G 3/36* (2006.01)
*G02F 1/1334* (2006.01)

(52) U.S. Cl.
CPC ......... *G09G 3/3413* (2013.01); *G02F 1/1334* (2013.01); *G09G 3/36* (2013.01); *G09G 2310/08* (2013.01); *G09G 2320/0233* (2013.01); *G09G 2320/0626* (2013.01)

(58) Field of Classification Search
CPC .... G09G 3/3413; G09G 3/36; G09G 2310/08; G09G 2320/0233; G09G 2320/0626; G02F 1/1334
See application file for complete search history.

(56) References Cited

U.S. PATENT DOCUMENTS

| | | | | |
|---|---|---|---|---|
| 2013/0258711 A1* | 10/2013 | Okuyama | ............ | G02B 6/0011 362/611 |
| 2014/0139461 A1* | 5/2014 | Furukawa | .............. | G09G 3/342 345/173 |
| 2014/0232834 A1* | 8/2014 | Sato | ........................ | G09G 5/003 348/51 |
| 2014/0240642 A1* | 8/2014 | Furukawa | ......... | G02F 1/133606 349/65 |
| 2014/0300528 A1* | 10/2014 | Ebisui | ............... | G02F 1/133615 345/32 |
| 2016/0070047 A1* | 3/2016 | Okuyama | ......... | G02F 1/133617 349/71 |
| 2016/0112690 A1* | 4/2016 | Yang | ...................... | G09G 3/346 345/690 |
| 2016/0163271 A1* | 6/2016 | Sakaigawa | ........ | G02F 1/133615 345/694 |
| 2016/0231497 A1* | 8/2016 | Kato | .................... | G02B 6/0035 |

(Continued)

FOREIGN PATENT DOCUMENTS

JP 2016-51002 A 4/2016

*Primary Examiner* — Jose R Soto Lopez
(74) *Attorney, Agent, or Firm* — Oblon, McClelland, Maier & Neustadt, L.L.P.

(57) ABSTRACT

According to an aspect, a display device, includes: a display panel that includes a polymer-dispersed liquid crystal sealed between two facing substrates and is configured to display a frame image by arranging a plurality of line images in a scanning direction; and a light source that is configured to emit light from one side surface side of the display panel. One frame period assigned to the frame image includes an image display period and a luminance correction period, and a total luminance of the display panel during the luminance correction period is increased with decreasing distance from an opposite side of the one side surface side.

14 Claims, 9 Drawing Sheets

(56) References Cited

U.S. PATENT DOCUMENTS

| | | | |
|---|---|---|---|
| 2017/0047021 A1* | 2/2017 | Yashiki | G09G 3/34 |
| 2017/0103715 A1* | 4/2017 | Oyama | G02F 1/133504 |
| 2017/0160592 A1* | 6/2017 | Okuyama | G02F 1/133615 |
| 2018/0024403 A1* | 1/2018 | Yata | G02F 1/133514 |
| | | | 349/68 |
| 2018/0308414 A1* | 10/2018 | Kang | G09G 3/3674 |
| 2019/0129209 A1* | 5/2019 | Kobayashi | G02F 1/1334 |
| 2019/0147811 A1* | 5/2019 | Yoshida | G09G 3/20 |
| | | | 345/691 |
| 2020/0202778 A1* | 6/2020 | Xu | G09G 3/3233 |

\* cited by examiner

DISPLAY DEVICE

CROSS-REFERENCE TO RELATED APPLICATIONS

This application claims priority from Japanese Application No. 2019-128616, filed on Jul. 10, 2019, the contents of which are incorporated by reference herein in its entirety.

BACKGROUND

1. Technical Field

The present disclosure relates to a display device.

2. Description of the Related Art

It is known that there are display devices using liquid crystal that have a configuration in which a light source is provided on the side surface side of a display panel (for example, Japanese Patent Application Laid-open Publication No. 2016-51002 (JP-A-2016-51002)).

In the display device disclosed in JP-A-2016-51002, part of the display panel closer to the light source becomes relatively bright, and part thereof further away from the light source becomes relatively dark. Consequently, nonuniformity occurs in the luminance distribution of an image due to the positional relation between the display panel and the light source.

For the foregoing reason, there is a need for a display device capable of reducing the nonuniformity of the luminance distribution of an image due to the positional relation between the display panel and the light source.

SUMMARY

According to an aspect, a display device includes: a display panel that includes a polymer-dispersed liquid crystal sealed between two facing substrates and is configured to display a frame image by arranging a plurality of line images in a scanning direction; and a light source that is configured to emit light from one side surface side of the display panel. One frame period assigned to the frame image includes an image display period and a luminance correction period, and a total luminance of the display panel during the luminance correction period is increased with decreasing distance from an opposite side of the one side surface side.

DETAILED DESCRIPTION

Figure 1:
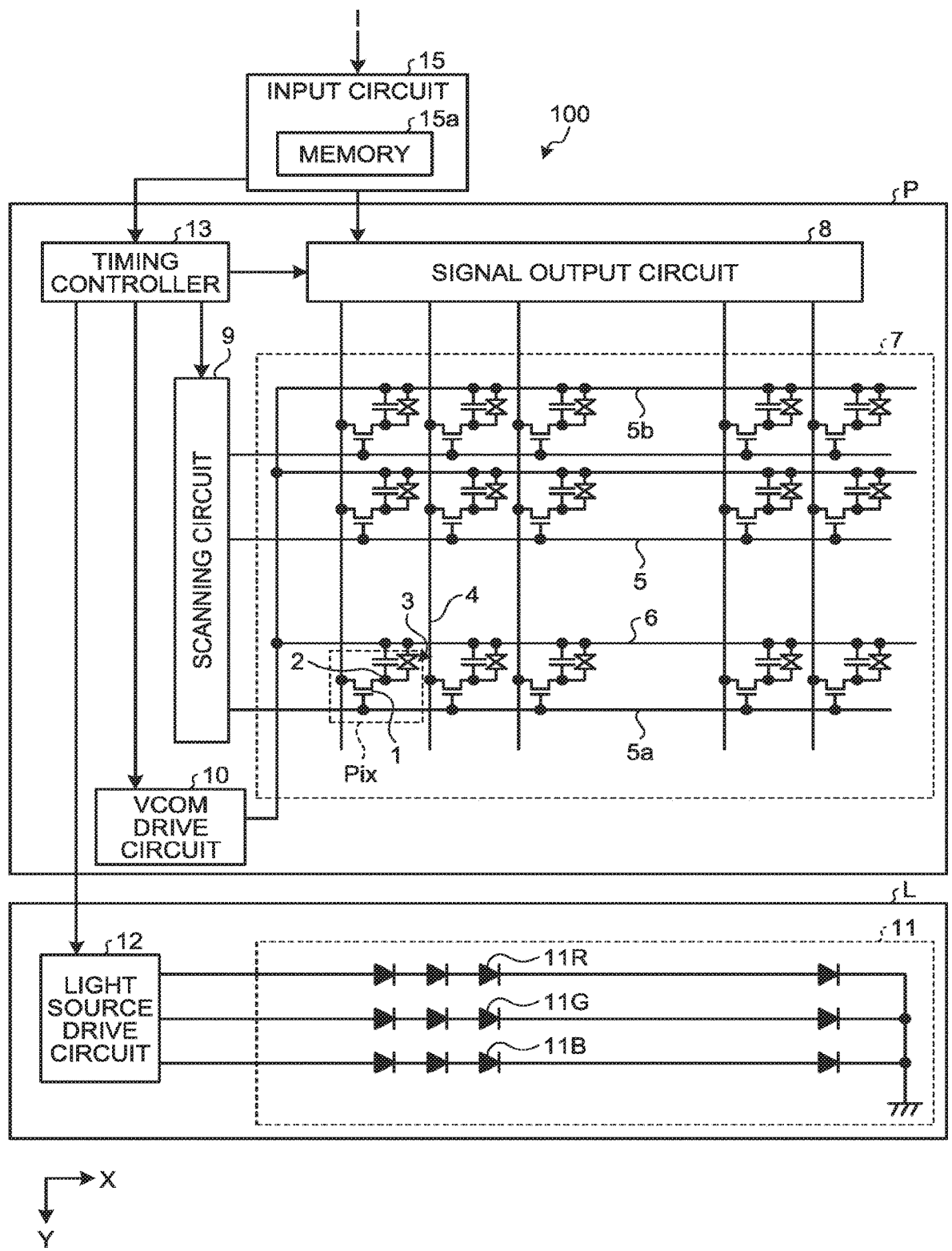
FIG. 1 is a schematic circuit diagram illustrating a main configuration of a display system.

Hereinafter, embodiments of the present invention will be described in detail with reference to the accompanying drawings. What is disclosed herein is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings compared with an actual aspect. However, the drawings are merely examples, and do not limit the interpretation of the present invention. In the present specification and the drawings, the same components as those described in the drawings that have already been discussed are denoted by the same reference numerals, and detailed description thereof will be omitted as appropriate.

In this disclosure, when an element is described as being "on" another element, the element can be directly on the other element, or there can be one or more elements between the element and the other element.

First Embodiment

FIG. 1 is a schematic circuit diagram illustrating a main configuration of a display device 100. The display device 100 includes a liquid crystal display panel P and a light source device L. The liquid crystal display panel P includes a display unit 7, a signal output circuit 8, a scanning circuit 9, a common voltage (VCOM) drive circuit 10, a timing controller 13, and a power supply circuit 14. Hereinafter, a surface of the liquid crystal display panel P facing the display unit 7 is referred to as a display surface, and the other surface thereof is referred to as a rear surface. Sides of the display device 100 are located in a direction intersecting with (for example, orthogonal to) a facing direction in which the display surface and the rear surface face each other, with respect to the display device 100.

Figure 2:
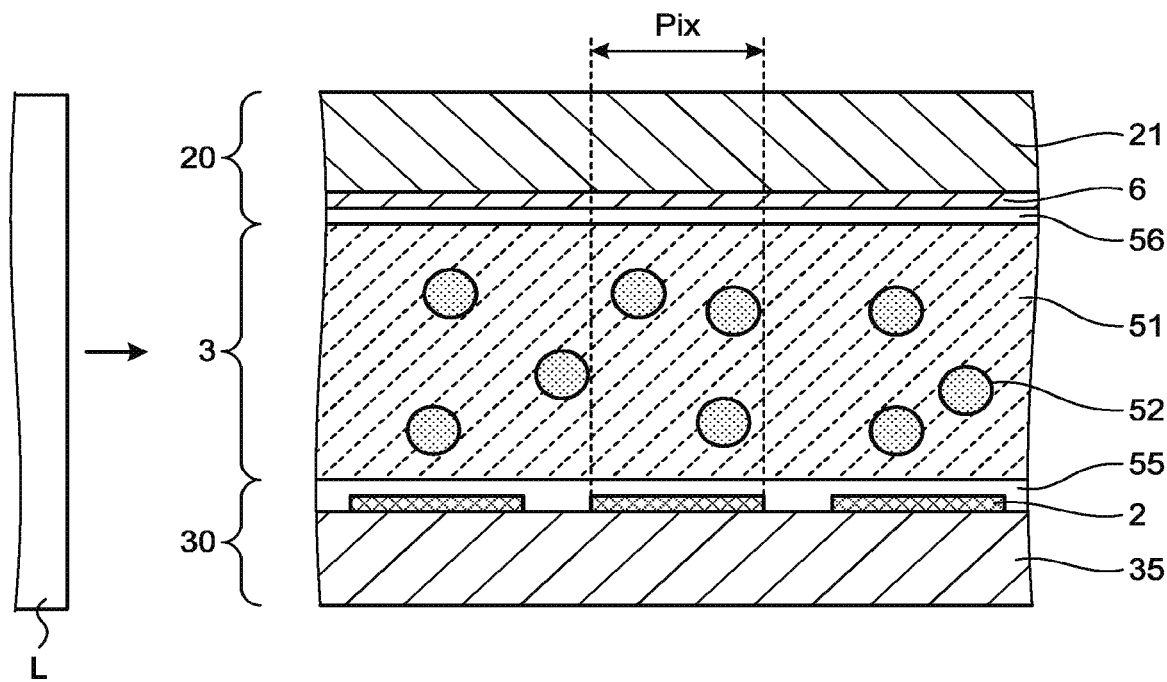
FIG. 2 is a schematic sectional view of a liquid crystal display panel.

A plurality of pixels Pix are disposed in a matrix (row-column configuration) in the display unit 7. Each of the pixels Pix includes a switching element 1 and two electrodes. In FIG. 1 and FIG. 2, which will be described below, a pixel electrode 2 and a common electrode 6 are illustrated as the two electrodes.

FIG. 2 is a schematic sectional view of the liquid crystal display panel P. The liquid crystal display panel P includes two substrates facing each other, and liquid crystal 3 sealed between the two substrates. Hereinafter, one of the two substrates is referred to as a first substrate 30, and the other substrate is referred to as a second substrate 20.

The first substrate 30 includes a translucent glass substrate 35, the pixel electrodes 2 layered on the second substrate 20 side of the glass substrate 35, and an insulating layer 55 layered on the second substrate 20 side of the glass substrate 35 so as to cover the pixel electrodes 2. The pixel electrodes 2 are individually provided for the respective pixels Pix. The second substrate 20 includes a translucent glass substrate 21, the common electrode 6 layered on the first substrate 30 side of the glass substrate 21, and an insulating layer 56 layered on the first substrate 30 side of the common electrode 6 so as to cover the common electrode 6. The common electrode 6 is formed in a plate shape or a film shape and shared among the pixels Pix.

The liquid crystal 3 in the first embodiment is a polymer-dispersed liquid crystal. More specifically, the liquid crystal 3 includes bulk 51 and a plurality of fine particles 52. The orientation of the fine particles 52 varies depending on the potential difference between the pixel electrode 2 and the common electrode 6 in the bulk 51. By individually controlling the potential of the pixel electrode 2 for each pixel Pix, at least one of a degree of translucency and a degree of dispersion is controlled for each pixel Pix.

In the first embodiment described with reference to FIG. 2, the pixel electrodes 2 and the common electrode 6 face each other such that the liquid crystal 3 is interposed therebetween. However, the liquid crystal display panel P may also be configured such that the pixel electrodes 2 and the common electrode 6 are provided or a single substrate and the orientation of the liquid crystal 3 is controlled by the electric field generated by the pixel electrodes 2 and the common electrode 6.

Next, a mechanism for controlling the potential of the pixel electrode 2 and the common electrode 6 will be described. As illustrated in FIG. 1, for example, the switching element 1 is a semiconductor switching element such as a thin film transistor (TFT). One of a source and a drain of the switching element 1 is coupled to one (pixel electrode 2) of the two electrodes. The other of the source and the drain of the switching element 1 is coupled to a signal line 4. A gate of the switching element 1 is coupled to a scanning line 5. Under the control of the scanning circuit 9, the scanning line 5 applies a potential for controlling the conduction between the source and drain of the switching element 1. The scanning circuit 9 controls the potential.

In the example illustrated in FIG. 1, a plurality of the signal lines 4 are arranged in one (row direction) of the arrangement directions of the pixels Pix. The signal lines A extend in the other direction (column direction) of the arrangement directions of the pixels Pix. Each of the signal lines 4 is shared among a plurality of the switching elements 1 of the pixels Pix arranged in the column direction. A plurality of the scanning lines 5 are arranged in the column direction. The scanning lines 5 extend in the row direction. Each of the scanning lines 5 is shared among the switching elements 1 of the pixels Pix arranged in the row direction.

In the explanation of the embodiment, an X direction is the extending direction of the scanning lines 5, and a Y direction is the direction in which the scanning lines 5 are arranged. In FIG. 1, among the scanning lines 5, a scanning line 5a is arranged at one end in the Y direction, and a scanning line 5b is arranged at the other end in the Y direction.

The common electrode 6 is coupled to the VCCM drive circuit 10. The VCOM drive circuit 10 applies a potential as a common potential to the common electrode 6. The signal output circuit 8 outputs a gradation signal, which will be described later, to the signal line 4, at a timing when the scanning circuit 9 applies a potential as a driving signal to the scanning line 5, thereby charging the liquid crystal (fine particles 52) as a capacitive load and a storage capacitance formed between the pixel electrode 2 and the common electrode 6. Thus, the voltage between the pixel Pix and the common electrode 6 will be a voltage corresponding to the gradation signal. After the application of the driving signal stops, the liquid crystal (fine particles 52) as the capacitive load and the storage capacitance holds the gradation signal. The scattering of light, which is scattered by the liquid crystal (fine particles 52), is controlled in accordance with the voltage of each pixel Pix and the voltage of the common electrode 6. For example, the liquid crystal 3 may be a polymer-dispersed liquid crystal in which the degree of its scattering increases as the potential difference (voltage) between each pixel Pix and the common electrode 6 increases. For example, the liquid crystal 3 may also be a polymer-dispersed liquid crystal in which the degree of its scattering increases as the potential difference (voltage) between each pixel Pix and the common electrode 6 decreases.

As illustrated in FIG. 2, the light source device L is disposed at a side of the liquid crystal display panel P. The light source device L includes a light source 11 and a light source drive circuit 12. The light source 11 includes a first light source 11R that emits red light, a second light source 11G that emits green light, and a third light source 11B that emits blue light. The first light source HR, the second light source 11G, and the third light source 11B emit light under the control of the light source drive circuit 12. For example, the first light source 11R, the second light source 11G, and the third light source 11B of the first embodiment are light sources that use a light emitting element such as a light emitting diode (LED). However, it is not limited thereto, and the first light source 11R, the second light source 11G, and the third light source 11B may also be a light source the light emission timing of which can be controlled. The light source drive circuit 12 controls the light emission timing of the first light source 11R, the second light source 11G, and the third light source 11B under the control of the timing controller 12.

When light is emitted from the light source 11, the display unit 7 is illuminated with light emitted from one surface side thereof in the Y direction. The pixels Pix transmit or scatter the light emitted from the one surface side in the Y direction. The scattering degree depends on the state of the liquid crystal 3 controlled in accordance with the gradation signal.

The timing controller 13 is a circuit that controls operation timings of the signal output circuit 8, the scanning circuit 9, the VCOM drive circuit 10, and the light source drive circuit 12. In the embodiment, the timing controller 13 operates based on the signal that is input via an input circuit 15.

The input circuit 15 outputs a signal based on an input signal I (see FIG. 1) from the outside of the display device 100, to the timing controller 13 and the signal output circuit 8. When a pixel signal is a signal indicating an RGB gradation value assigned to a certain pixel Pix, the input signal I, which is supplied to the input circuit 15 to output a frame image, is a set of a plurality of the pixel signals for the pixels Pix on the display unit 7. The input circuit 15 may be provided to one of the substrates included in the liquid crystal display panel P, may be mounted on a flexible print substrate on which wiring and the like extending from the liquid crystal display panel P are provided, or may be provided outside the liquid crystal display panel P.

A signal supplied to the timing controller 13 from the input circuit 15 may be the input signal I, or a signal indicating the input timing of the gradation signal generated based on the input signal I. The signal may be any signal as long as, by supplying the signal to the timing controller 13 from the input circuit 15, information required for controlling the output timing of the driving signal for supplying the gradation signal to each pixel Pix and the operation timing of the signal output circuit 8 can be obtained.

Figure 3:
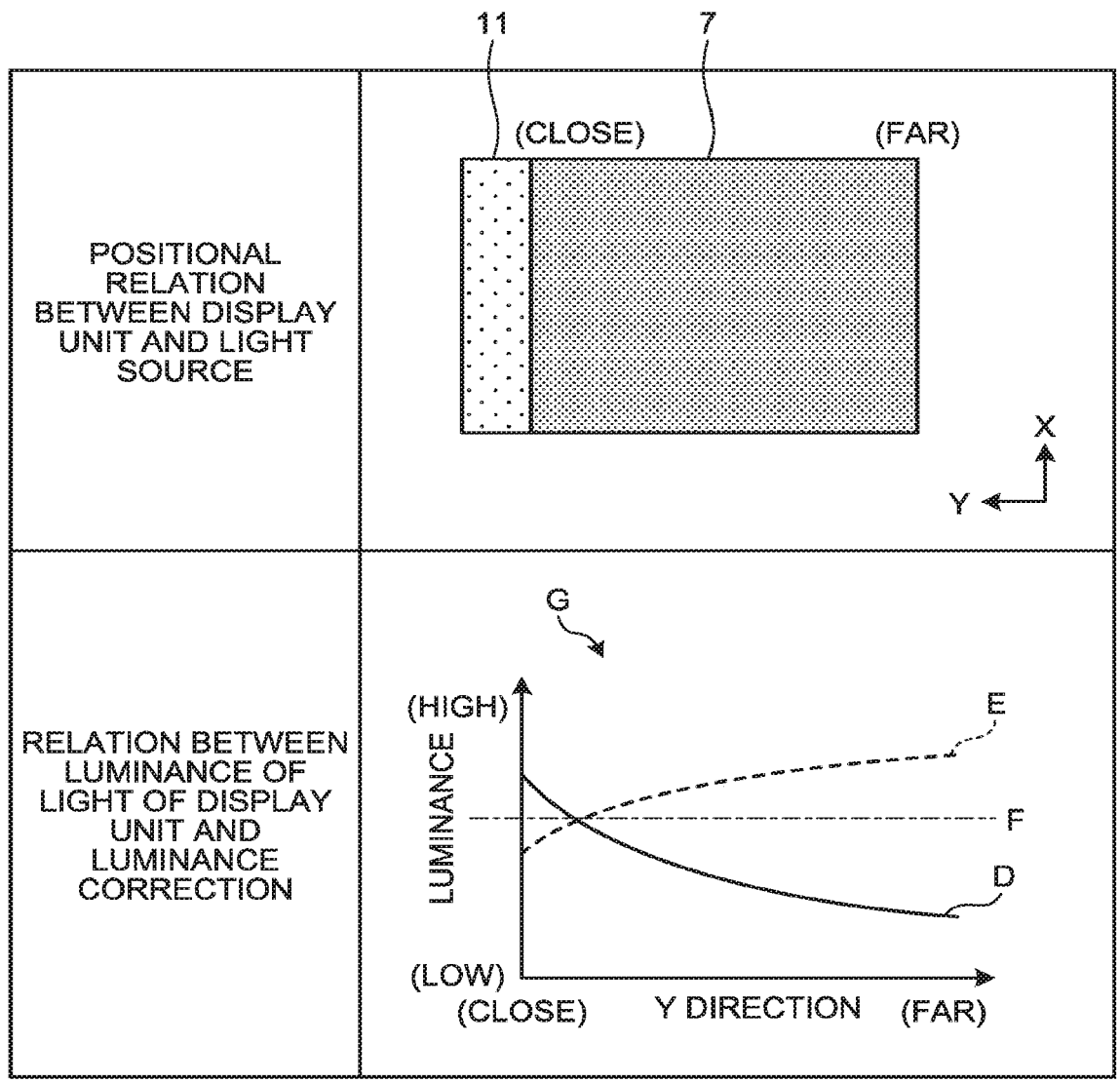
FIG. 3 is a diagram for illustrating a positional relation between a display unit and a light source, and a relation between the luminance of light from the light source side of the display unit toward the opposite side thereof and luminance correction.

FIG. 3 is a diagram for illustrating a positional relation between the display unit 7 and the light source 11, and a relation between the luminance of light from the light source 11 side of the display unit 7 toward the opposite side thereof and luminance correction. As illustrated in the section of the "positional relation between display unit and light source" in FIG. 3, the light source 11 emits light from one side surface side of the display unit 7. More specifically, the light source 11 is disposed at the one end side of the display unit 7 in the Y direction. In this disclosure, the meaning of the "luminance correction" includes "luminance compensation" and/or "luminance adjustment".

The light emitted to the display unit 7 is attenuated in a layer of the liquid crystal 3 (liquid crystal layer). Consequently, the luminance of the light emitted from the light source 11 differs depending on its position in the Y direction. More specifically, for example, as is evident from the curve D in the graph G illustrated in the section of the "relation between luminance of light of display unit and luminance correction" in FIG. 3, the luminance increases with decreasing distance from the light source 11, and the luminance decreases with, increasing distance from the light source 11. A degree of decrease in luminance from the light source 11 side toward the opposite side becomes more significant with decreasing distance from the light source 11.

For example, as illustrated by the straight line F, it is preferred that the luminance of light emitted to the pixels Pix in the display unit 7 do not depend on the relative distance from the light source 11. Thus, in the embodiment, luminance correction is performed during a luminance correction period FI4, which will be described below. More specifically, in the embodiment, for example, as illustrated by the curve E, control is performed in which the luminance of light scattered by the pixels Pix is corrected such that the luminance is increased with increasing distance from the light source 11. Even when the luminance of light emitted to the display unit 7 looks like the curve D due to the positional relation between the display unit 7 and the light source 11, the luminance correction such as above can reduce the luminance difference of light of the pixels Pix during a predetermined period.

More specifically, in the embodiment, the luminance correction is performed by providing, in the frame period FL during which the frame image is displayed, a luminance correction period different from an image display period of a frame image.

Figure 4:
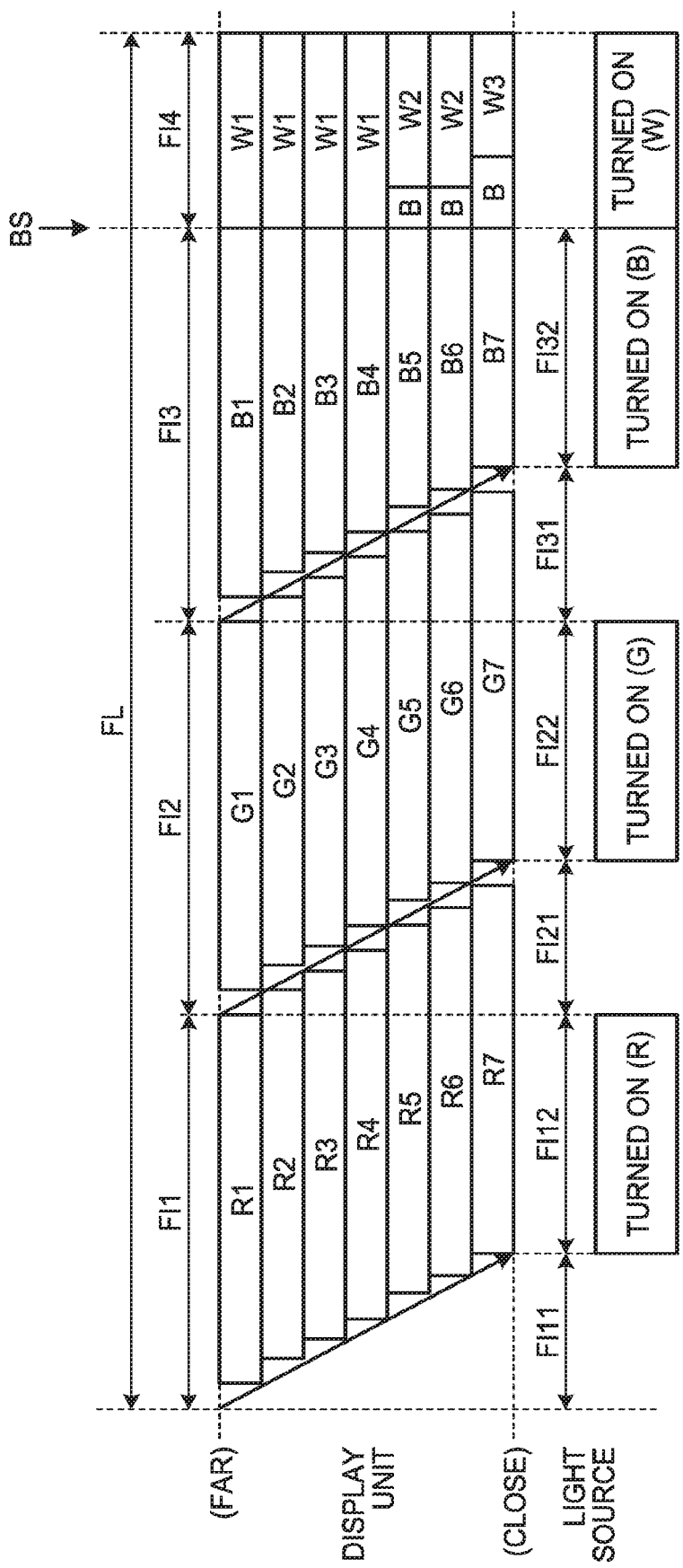
FIG. 4 is a time chart illustrating an example of a field sequential control including a luminance correction period.

FIG. 4 is a time chart illustrating an example of a field sequential control including a luminance correction period. As illustrated in FIG. 4, in the first embodiment, a time-division color display output method (field sequential color (FSC) method) is used. In the time-division color display output method (FSC method), field periods FI1, FI2, and FI3 that use light from light sources of different colors (for example, the first light source HR, the second light source 11G, and the third light source 11B are provided in the image display period included in the one frame period FL.

More specifically, in the first embodiment, a gradation signal corresponding to the gradation value of a different color is written during each of the field periods FI1, FI2, and FI3 included in the one frame period FL. For example, when a pixel signal is expressed by RGB gradation values, it is assumed (R, G, B)=(r1, g1, b1). r1 is a gradation value of red (R) in an input signal that includes information on the RGB gradation values, and functions as a red (R) component in an image to be displayed on the display unit 7. g1 is a gradation value of green (G) in the input signal that includes information on the RGB gradation values, and functions as a green (G) component in the image to be displayed on the display unit 7. b1 is a gradation value of blue (B) in the input signal that includes information on the RGB gradation values, and functions as a blue (B) component in the image to be displayed on the display unit 7. In this case, a gradation signal corresponding to the gradation value of "r1" is written during a writing period FI11 of the field period FI1. A gradation signal corresponding to the gradation value of "g1" is written during a writing period FI21 of the field period FI2. A gradation signal corresponding to the gradation value of "b1" is written during a writing period FI31 of the field period FI3. During holding period FI12, FI22, and FI32 included in the respective field periods, the gradation signals corresponding to the gradation values of different colors written during the writing periods in this manner are held. During the field periods FI1, FI2, and FI3 described above, writing and holding the gradation signals is performed for each of the pixels Pix.

The light sources of multiple colors (for example, the first light source HR, the second light source 11G, and the third light source 11B) in the light source 11 are turned ON during the holding periods of the corresponding field periods. In the first embodiment, the first light source 11R is a red light source, the second light source 11G is a green light source, and the third light source 11B is a blue light source. In FIG. 4 and other figures, the lighting period of the first light source 11R in the holding period FI12 is illustrated by "turned ON (R)". In FIG. 4 and other figures, the lighting period of the second light source 11G in the holding period FI22 is illustrated by "turned ON (G)". In FIG. 4 and other figures, the lighting period of the third light source 11B in the holding period FI32 is illustrated by "turned ON (B)". In this manner, the light source 11 is turned ON during each holding period, thereby displaying an image. Thus, the period including the field periods FI1, FI2, and FI3 functions as the image display period.

During the writing periods FI11, FI21, and FI31, the scanning circuit 9 outputs the driving signal to the scanning line 5 to turn ON the TFTs provided in the pixels Pix, and the signal output circuit 8 outputs gradation signals to the signal lines 4 to write the gradation signals to the pixels Pix. Thus, the gradation signals are simultaneously written to the pixels Pix included in a pixel row that are coupled to the same scanning line 5, and that are simultaneously turned ON in accordance with the driving signal output to the scanning line 5. When an image written to the pixel row coupled to the same scanning line 5 in this manner is referred to as a line image, the frame image is formed of a plurality of the line images that are arranged in the arrangement direction of the scanning lines 5. The line image is an image displayed and output by the pixels Pix that are arranged in the extending direction of the scanning lines 5 (arrangement direction of the signal lines 4). Hereinafter, unless otherwise specifically indicated, when simply referred to as a "line", it refers to the pixel row that outputs a line image.

In the time chart in FIG. 4 and other figures, as illustrated in the section of the "positional relation between display unit and light source" in FIG. 3, the positional relation between the display unit 7 and the light source 11 is indicated by a mark "(CLOSE)" at one side surface side closer to the light source 11 in the display unit 7, and a mark "(FAR)" at the opposite side.

FIG. 4 and other figures exemplarily illustrates how gradation signals related to line images output to a display area of seven lines is controlled. For example, in FIG. 4, FIG. 5, FIG. 7, and FIG. 3 excluding FIG. 6, which will be described later, during each of the writing periods FI11, FI21, and FI31, the driving signal is output from the scanning circuit 9 to the scanning lines 5 such that the scanning lines 5 are sequentially scanned from the side away from the light source 11 (scanning line 5b side in FIG. 1) toward the side closer to the light source 11 (scanning line 5a side in FIG. 1). Consequently, during the writing period FI11, line images R1, R2, R3, R4, R5, R6, and R7 of the red (R) component are sequentially written to the display area of seven lines illustrated in FIG. 4. During the writing period FI21, line images G1, G2, G3, G4, G5, G6, and G7 of the green (G) component are sequentially written. During the writing period FI31, line images of B1, B2, B3, B4, B5, B6, and B7 of the blue (B) component are sequentially written. The line images with reference signs that have different final numbers are line images output from the pixels Pix coupled to different scanning lines 5. For example, the line image R1 and the line image R2 are line images output from the pixels Pix coupled to the different scanning lines 5. The line images with reference signs that have the same final number are line images output from the pixels Pix coupled to the same scanning line 5. For example, the line image R1, the line image G1, and the line image B1 are line images displayed by the pixels Pix coupled to the same scanning line 5 at different periods.

The configuration and control of the seven lines in FIG. 4 and other figures are merely examples for easy understanding, and the number of lines of the display unit 1 is not limited to seven lines. The number of lines of the display unit 7 may be plural such as equal to or less than six or equal to or greater than eight.

The frame period FL includes the image display period (field periods FI1, FI2, and FI3), and the luminance correction period FI4. More specifically, in the one frame period FL, a reset timing BS is provided subsequent to the field period FI3, and the luminance correction period FI4 is provided subsequent to the reset timing BS.

At the reset timing BS, all the pixels Pix in the display unit 7 are reset such that the light scattering degree becomes equal to or less than a predetermined value (for example, the minimum gradation corresponding to a transparent state or the like). More specifically, for example, the scanning circuit 9 applies the driving signal to all the scanning lines 5, and the signal output circuit 8 operates such that, the potentials of all the signal lines 4 correspond to the minimum gradation value (for example, zero), thereby resetting all the pixels Pix in the display unit 7.

During the luminance correction period FI4 subsequent to the reset timing BS, a gradation signal for performing luminance correction is written line by line to each pixel Pix. More specifically, a gradation signal corresponding to the gradation value higher than the minimum gradation value that is applied to all the pixels Pix at the reset timing BS, is applied to each pixel Pix. During the luminance correction period FI4 illustrated in FIG. 4 to FIG. 8, unlike the field periods FI1, FI2, and FI3, the writing period of a gradation signal and the holding period of the gradation signal are not completely separated in time, and the light from the light source 11 is emitted from the beginning to the end of the luminance correction period FI4.

The light emitted during the luminance correction period FI4 is white color light. In FIG. 4 and other figures, the lighting period during which the light source 11 emits white color light is illustrated by "turned ON (W)". More specifically, the light source device L turns ON the first light source 11R, the second light source 11G, and the third light source 11B to emit white color light as synthetic light of the red (R) light, the green (G) light, and the blue (B) light.

During the luminance correction period FI4, the pixels Pix are controlled such that total luminance of a pixel Pix farther from the light source 11 is higher than that of a pixel Pix closer to the light source 11 in the display unit 7. In this disclosure, a process of making the total luminance higher may be a process of making luminance per unit of time higher; a process of making the lighting time longer without making luminance per unit of time higher; or a process of making luminance per unit of time higher as well as making the lighting time longer. In this example, the pixels Pix are controlled such that the scattering time is increased with increasing distance of the pixels Pix from the light source 11. For example, in FIG. 4, immediately after the reset timing BS, the first light source 11R, the second light source 11G, and the blue (B) light source are all turned ON. Then, immediately after the reset timing BS, a line image W1 is supplied to the pixels Pix that have been supplied with the line images R1, G1, and B1 during the image display period and are coupled to the scanning line 5 located further away from the light source 11. The line image W1 is then held until the end of the luminance correction period FI4. At a timing after the timing at which the line image W1 is supplied, a line image W3 is supplied to the pixels Pix that have been supplied with the line images R7, G7, and B7 during the image display period and are coupled to the scanning line 5 located closer to the light source 11. The line image W3 is then held until the end of the luminance correction period FI4. At a timing after the timing at which the line image W1 is supplied and before the timing at which the line image W3 is supplied, a line image W2 is supplied to a line or lines between the line to which the line image W1 is supplied and the line to which the line image W3 is supplied in the positional relation with the light source 11. For example, the line image w2 is supplied to a line of the pixels Pix that have been supplied with the line images R6, G6, and B6 during the image display period and are coupled to the scanning line 5 closer to the light source 11. The line image W2 is then held until the end of the luminance correction period FI4. In the lines to which the line image W2 or the line image W3 is supplied, the potential applied at the reset timing BS is held in the pixels Pix until the line image W2 or the line image W3 is supplied. FIG. 4 and other figures illustrate a black period B as a period during which the potential applied at the reset timing BS is held. In FIG. 4, the line image W1 is supplied to the first four rows at the same timing, then the line image W2 is supplied at the same timing, and then the line image W3 is supplied. However, the line images may also be supplied at different timings from the line further away from the light source 11. It is possible to reduce the luminance correction period, by supplying the line image to a plurality of the lines at the same timing.

The line image W1, the line image W2, and the line image W3 may be gradation signals with the same potential, or gradation signals with different potentials. The line image W1, the line image W2, and the line image W3 correspond to gradation values higher than the minimum gradation value applied to all the pixels Pix at the reset timing BS, and are images for further increasing the luminance by scattering the white color light applied during the luminance correction period FI4. In the first embodiment, for example, the line image W1, the line image W2, and the line image W3 are gradation signals for applying a potential corresponding to the maximum gradation value (for example, 255 in the case of an 8-bit gradation control) to the pixels Pix. When the line image W1, the line image W2, and the line image W3 are gradation signals with different potentials, the potentials are controlled such that the light scattering degree of the pixels Pix by the line image W2 becomes equal to or greater than the light scattering degree of the pixels Pix by the line image W3, and such that the light scattering degree of the pixels Pix by the line image W1 becomes equal to or greater than the light scattering degree of the pixels Pix by the line image W2 and the line image W3. The line images W1, W2, and W3 in the embodiment, and the line images B1 and B2, which will be described later, are line images in which the gradation values of the pixels Pix arranged in the X direction are the same.

In the lines to which the line image W2 or the line image W3 is to be supplied, the potential applied at the reset timing BS causes the light scattering degree of the pixels Pix to be a minimum, during the period until the line image W2 or the line image W3 is supplied. Thus, in the entire luminance correction period FI4, the line supplied with the line image W1 immediately after the reset timing BS is visually recognized to have higher luminance than the lines supplied with the line image W2 or the line image W3, because the period of time during which the light scattering degree of the pixels Pix is kept to a minimum due to the potential applied thereto at the reset timing BS is the shortest. The line supplied with the line image W2 is visually recognized to have higher luminance than the line supplied with the line image W3, because the period of time during which the light scattering degree of the pixels Pix is kept to a minimum due to the potential applied thereto at the reset timing BS is shorter than that of the line supplied with the line image W3. In this manner, the light scattering period of the line relatively further away from the light source 11 during the luminance correction period FI4 is caused to be longer than the light scattering period of the line relatively closer to the light source 11 during the luminance correction period FI4. Consequently, it is possible to cause the total luminance of the line relatively further away from the light source 11 during the luminance correction period FI4 to be higher than the total luminance of the line relatively closer to the light source 11 during the luminance correction period FI4. Thus, it is possible to correct, during the luminance correction period FI4 (for example, refer to the curve E in FIG. 3), the luminance difference (for example, refer to the curve D in FIG. 3) caused by the relative difference in distance of the lines from the light source 11 in the image display period, thereby reducing the visible luminance difference.

The pixels Pix coupled to the same signal line 4 are coupled to different scanning lines 5. In this example, by applying a driving signal to a plurality of scanning lines 5 at the same timing, the gradation signals can be collectively written to the pixels Pix that are simultaneously driven by the driving signal. The pixels Pix simultaneously driven are such the pixels Pix that are coupled to the scanning lines 5 supplied with the driving signal at the same timing and are coupled to the same signal line 4. Thus, when the scanning lines 5 are supplied with the driving signal at the same timing, and the line images are written to a plurality of pixel rows, the line images of the pixel rows that are collectively written will be the same line image.

In the first embodiment, on the basis of the relation between the signal line 4, the scanning line 5, and the pixels Pix described above, the same line image is written to the lines at a certain timing during the luminance correction period FI4. More specifically, as illustrated in FIG. 4, immediately after the reset timing BS, the line image W1 is supplied to the pixels Pix included in the four lines to which the line images R1, G1, and B1, the line images R2, G2, and B2, the line images R3, G3, and B3, or the line images R4, G4, and B4 are supplied during the image display period. The line image W1 is then held until the end of the luminance correction period FI4. The driving signal output from the scanning circuit 9 when the line image W1 is written, is applied to the scanning lines 5 of the four lines at the same timing. At the timing later than the supply of the line image W1, the line image W2 is supplied to the pixels Pix of the two lines to which the line images R5, G5, and B5, or the line images R6, G6, and B6 are supplied during the image display period. The line image W2 is then held until the end of the luminance correction period FI4. The driving signal output from the scanning circuit 9 when the line image W2 is written, is applied to the scanning lines 5 of the two lines at the same timing.

As illustrated by the curve E in FIG. 3, a degree of decrease in luminance from the light source 11 side toward the opposite side becomes moderate with increasing distance from the light source 11. Thus, when control of the light scattering degree is performed for the pixels Pix farther from the light source 11 such as the pixels Pix of the four lines illustrated in FIG. 4 (for example, when the line image W1 is written to the four lines), the luminance can be controlled sufficiently with respect to the pixels Pix closer to the light source 11. Furthermore, in the above example, the line image W1 is written to the four lines further away from the light source 11. After the writing of the line image W1, the line image W2 is written to the two lines closer to the light source 11 than the four lines are. After the writing of the line image W2, the line image W3 is written to the one line closer to the light source 11 than the two lines are. In this manner, by reducing the number of lines to be collectively controlled with decreasing distance from the light source 11, luminance correction (see the curve E in FIG. 3) corresponding to the attenuation of luminance (see the curve D in FIG. 3) depending on the distance from the light source 11 can be achieved by the control of a plurality of lines.

In the above, the luminance correction during the luminance correction period FI4 has been described using the seven lines to which the line image W1, the line image W2, or the line image W3 is written as an example. However, the basic idea is the same even if the lines are equal to or less than six lines or equal to or more than eight lines. For example, if the lines are six lines, the line to which the line images R1, G1, and 31 are supplied during the image display period may be omitted. Then, the line image W1 may be supplied to three lines, the line image W2 may be supplied to two lines, and the line image W3 may be supplied to one line. If the lines are equal to or more than eight lines, the number of lines to which the line image W1, the line image W2, and the line image W3 are supplied may be increased as the total number of lines increases. Alternatively, the timings to apply a gradation signal for scatting the white color light may be increased to multiple stages more than three stages of the line image W1, the line image W2, and the line image W3. In this case, in a manner similar to the timings at which the line image W1, the line image W2, and the line image W3 are written in the three stages, the application timings are controlled such that the timings to apply the gradation signal for scattering the white color light to the line relatively further away from the light source 11 precedes the timings to apply the gradation signal for scattering the white color light to the line relatively closer to the light source 11.

A difference in the light scattering degree between the line image W1, the line image W2, and the line image W3 is determined such that the luminance distribution of the display unit 7 under a predetermined condition approaches a distribution having a flat shape (see the curve E in FIG. 3), regardless of the positional relation with the light source 11.

For example, the luminance distribution of the display unit 7 under the predetermined condition is the luminance distribution of the display unit 7 in what is called all white display state, in which the light scattering degree of all the pixels Pix is controlled to be maximum during the image display period. The potentials of the line image W1, the line image W2, and the line image W3 are determined such that the luminance distribution approaches the distribution having the flat shape as above, by the luminance of the pixels Pix during the luminance correction period FI4 obtained by a combination of the luminance of the pixels Pix when the line image W1 is supplied, the luminance of the pixels Pix when the line image W2 is supplied, the luminance of the pixels Pix when the line image W3 is supplied, and a state of the pixels Pix before the line image W2 or the line image W3 is supplied (black period B in FIG. 4).

Foe example, the timing controller 13 controls operations of the signal output, circuit 8, the scanning circuit 9, and the light source drive circuit 12 to provide the luminance correction period FI4 during the frame period FL. In the embodiment, the gradation signals during the field periods FI1, FI2, and FI3 are determined on the basis of the input signal I. However, a control pattern related to the gradation signals during the luminance correction period FI4 is incorporated in the circuit of the timing controller 13 in advance. A specific configuration for providing the luminance correction period FI14 is not limited thereto. For example, data corresponding to the gradation signals in the luminance correction period FI4 may be held in a memory 15a of the input circuit 15, and the gradation signals in the luminance correction period FI4 based on the data may be added to the gradation signals in the field periods FI1, FI2, and FI3 based on the input signal I during each frame period FL.

As described above, according to the first embodiment, the display device 100 includes the display panel (liquid crystal display panel P) that includes the liquid crystal 3 sealed between two facing substrates (the second substrate 20 and the first substrate 30) and displays a frame image by arranging the line images in the scanning direction. The display device 100 also includes the light source 11 that emits light from the one side surface side of the display panel. The one frame period FL assigned to one frame image includes the image display period and the luminance correction period FI4. The total luminance of the display panel during the luminance correction period FI4 is increased with decreasing distance from, the opposite side of the one side surface. Consequently, it is possible to correct, during the luminance correction period FI4, the luminance distribution of an image due to the positional relation between the display panel and the light source 11 during the image display period. Thus, even when, in the luminance distribution of an image due to the positional relation between the display panel and the light source 11 during the image display period, the luminance increase with decreasing distance from the one side surface, it is possible to reduce the nonuniformity of the luminance distribution of the image due to the positional relation between the display panel and the light source 11, as it is viewed as the luminance distribution during the entire frame period FL including the luminance correction period FI4.

The display panel (liquid crystal display panel P) during the luminance correction period is controlled such that the light scattering degree of the liquid crystal is increased with decreasing distance from the opposite side of the one side surface. Consequently, when the luminance distribution is viewed as the luminance distribution of the entire frame period FL including the luminance correction period FI4, it is possible to reduce the nonuniformity of the luminance distribution of an image due to the positional relation between the display panel and the light source 11. More specifically, the line image W2 is set as a gradation signal corresponding to a gradation value higher than that of the line image W3, and the line image W1 is set as a gradation signal corresponding to a gradation value higher than that of the line image W2. Consequently, the light scattering degree of the liquid crystal can be increased with decreasing distance from the opposite side of the one side surface.

The display panel (liquid crystal display panel P) during the luminance correction period is controlled such that the light scattering time of the liquid crystal is increased with decreasing distance from the opposite side of the one side surface. Consequently, when the luminance distribution is viewed as the luminance distribution of the entire frame period FL including the luminance correction period FI4, it is possible to reduce the nonuniformity of the luminance distribution of an image due to the positional relation between the display panel and the light source 11.

The image display period includes a predetermined number (for example, three) of subframe periods (for example, the field periods FI1, FI2, and FI3) corresponding to the number of colors (for example, red (R), green (G), and blue (B)) of light from the light source. Each of the subframe periods includes the writing period (for example, the writing period FI11, FI21, or FI31) of the line image, and the emitting period (for example, the holding period FI12, FI22, or FI32) during which light is emitted from the light source. The light emitted during the luminance correction period is a synthetic color of light from the light source. Consequently, the display device 100 using the FSC can reduce the nonuniformity of the luminance distribution of an image due to the positional relation between the display panel (liquid crystal display panel P) and the light source 11.

The light source 11 includes the first light source HR that emits red (RJ light, the second light source 11G that emits green (G) light, and the third light source 11B that emits blue (B) light. The light emitted from the light source 11 during the luminance correction period is white color light. Consequently, the display device 100 using the light source 11 that emits the light in such three colors can reduce the nonuniformity of the luminance distribution of an image due to the positional relation between the display panel (liquid crystal display panel P) and the light source 11.

The reset timing (reset timing BS) at which the light scattering degree of the liquid crystal 3 is set to a minimum is provided between the image display period and the luminance correction period FI4. Consequently, it is possible to hinder the gradation signal during the image display period from affecting the luminance correction period FI4.

The scanning direction during the image display period is a direction from the side away from the light source 11 (scanning line 5b side) toward the side closer to the light source 11 (scanning line 5a side). The reset sequence for resetting the scattering degree of the liquid crystal to be equal to or greater than a predetermined value after the reset timing (reset timing BS), is a sequence from the opposite side of the one side surface toward the one side surface side. Consequently, in accordance with the reset sequence, it is possible to control the display panel (liquid crystal display panel P) during the luminance correction period FI4 such that the light scattering time of the liquid crystal is increased with decreasing distance from the opposite side of the one side surface. It is also possible to cause the scanning direction during the writing periods FI11, FI21, and FI31 in the image display period to be the same as the scanning direction during the writing period in the luminance correction period FI4. Thus, with a simple control, it is possible to reduce the nonuniformity of the luminance distribution of an image due to the positional relation between the display panel and the light source 11.

In at least a part of the display panel (liquid crystal display panel P), the liquid crystal is controlled line by line in the resetting. Consequently, it is possible to reduce the writing period of the gradation signals for performing the luminance correction during the luminance correction period FI4. For example, to set the light scattering degree to be equal to or greater than a predetermined value, a voltage corresponding to the maximum gradation of the pixel signal is supplied to the pixel Pix.

Second Embodiment

Hereinafter, a display device of a second embodiment will be described in detail with reference to FIG. 5. In the description of the second embodiment, the same components as those in the first embodiment are denoted by the same reference numerals, and the description thereof will be omitted.

Figure 5:
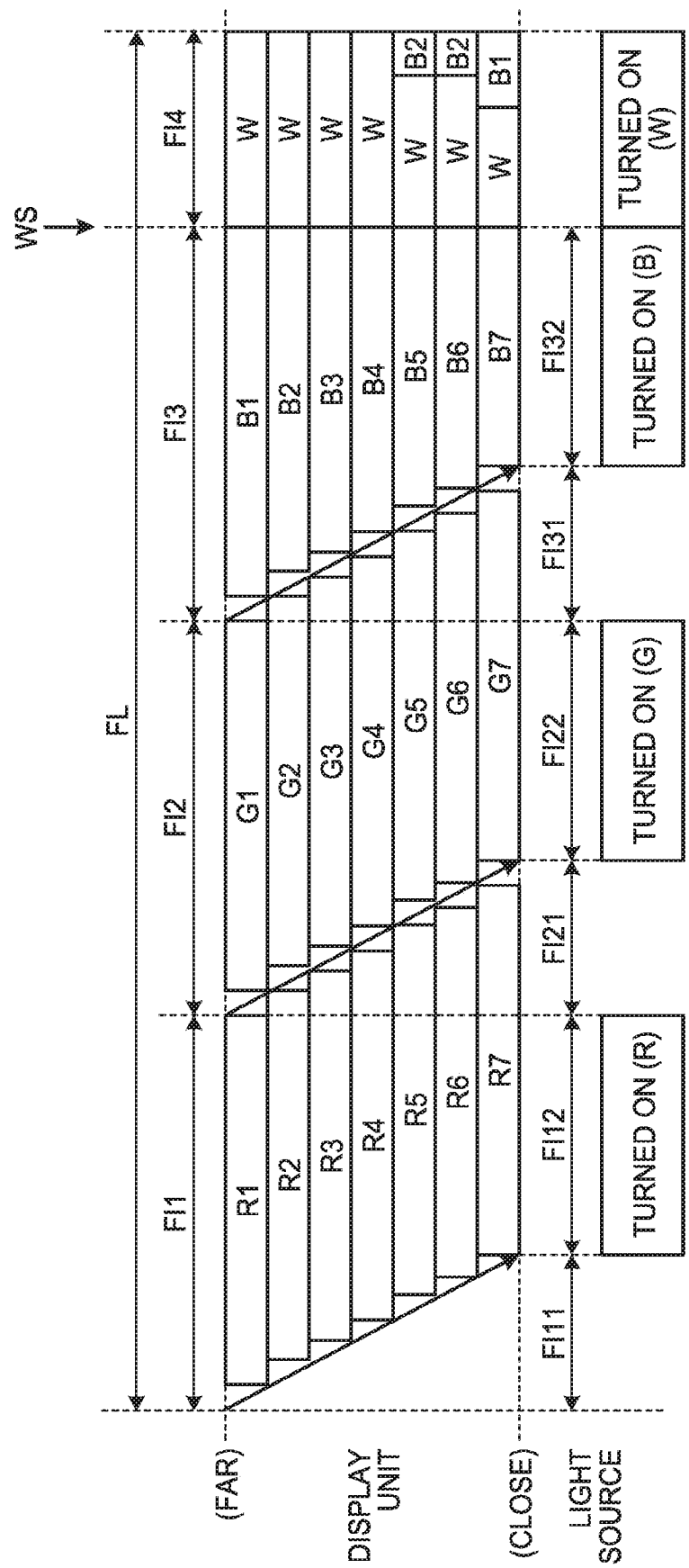
FIG. 5 is a time chart illustrating an example of a field sequential control in a second embodiment.

FIG. 5 is a time chart illustrating an example of a field sequential control in the second embodiment. In the second embodiment, instead of resetting at the reset timing BS as in the first embodiment, the light scattering degree of all the pixels Pix is reset, at a reset timing WS, to be equal to or greater than a predetermined value. The second embodiment is the same as the first embodiment except that the details of control for outputting gradation signals to the pixels Pix during the luminance correction period FI4 is different from that in the first embodiment.

In the second embodiment, the reset timing WS is provided subsequent to the field period FI3, and the luminance correction period FI4 is provided subsequent to the reset timing WS. At the reset timing WS, the light scattering degree of all the pixels Pix in the display unit 7 is reset to be equal to or greater than a predetermined value. More specifically, for example, the scanning circuit 9 applies the driving signal to all the scanning lines 5, and the signal output circuit 8 is operated such that the potential of all the signal lines 4 corresponds to a gradation value equal to or greater than a predetermined value (for example, 255 as the maximum gradation in the case of an 8-bit gradation control). Consequently, all the pixels Pix in the display unit 7 are reset.

The luminance correction period FI4 in the second embodiment is the same as the luminance period FI4 in the first embodiment in that the gradation signal for performing luminance correction is written line by line to the pixels Pix. However, the specific details of control for outputting the gradation signals is different from that in the first embodiment. More specifically, a gradation signal corresponding to the gradation value lower than the maximum gradation value applied to all the pixels Pix at the reset timing WS may be applied to the pixels Pix of one or some of the lines.

More specifically, in FIG. 5, during the luminance correction period FI4, the line image B1 is supplied to the pixels Pix that have been supplied with the line images R7, G7, and B7 during the image display period and are coupled to the scanning line 5 located closer to the light source 11. The line image B1 is then held until the end of the luminance correction period FI4. Then, immediately after the rest timing WS, a line image W is supplied to the pixels Pix coupled to the scanning line 5 at the side further away from the light source 11. The line image W is then held until the end of the luminance correction period FI4. At a timing after the timing at which the line image B1 is supplied, the line image B2 is supplied to lines placed between the line to which the line image B1 is supplied, and the line to which the line images R1, G1, and B1 are supplied during the image display period, in the positional relation with the light source 11. For example, the line image B2 is supplied to the pixels Pix that have been supplied with the line images R6, G6, and B6 during the image display period and are coupled to the scanning line 5 closer to the light source 11. The line image B2 is then held until the end of the luminance correction period FI4. The first light source 11R, the second light source 11G, and the third light source 11B are all turned ON immediately after the reset timing WS, and the light source 11 is turned OFF when the luminance correction period FI4 is finished.

In the line to which the line image B1 or the line image B2 is supplied, the potential applied at the reset timing WS is held in the pixel Pix, during the period until the line image B1 or the line image B2 of the next frame is supplied. In lines to which neither the line image B1 nor the line image B2 is supplied, the potential applied at the reset timing WS is held in the pixel Pix during the luminance correction period FI4. In FIG. 4 and other figures, the period during which the potential applied at the reset timing WS is held, is referred to as a white period W.

The line image B1 and the line image B2 may be the gradation signals with the same potential or may be the gradation signals with different potentials. The line image B1 and the line image B2 correspond to gradation values lower than the gradation value equal to or greater than a predetermined value applied to all the pixels Pix at the reset timing WS. In the first embodiment, for example, the line image W is a gradation signal for applying a potential corresponding to the maximum gradation value of the pixel signals to the pixels Pix. When the line image B1 and the line image B2 are the gradation signals with different potentials, the potential is controlled such that the light scattering degree of the pixels Pix by the line image B2 becomes equal to or greater than the light scattering degree of the pixels Pix by the line image B1.

In the lines to which the line image 31 or the line image B2 is to be supplied, the potential applied at the reset timing WS causes the light scattering degree of the pixels Pix to be equal to or greater than a predetermined value, during the period until the line image B1 or the line image B2 is supplied. Thus, in the entire luminance correction period FI4, the line supplied with the line image B1 has lower luminance than the line supplied with the line image B2 and the line supplied with neither the line image B1 nor the line image B2, because the period of time during which the light scattering degree of the pixels Pix is equal to or greater than a predetermined value due to the potential applied thereto at the reset timing WS is the shortest. The line supplied with the line image B2 has higher luminance than the line supplied with the line image B1, because the period of time during which the light scattering degree of the pixels Pix is equal to or greater than a predetermined value due to the potential applied thereto at the reset timing WS is longer than that of the line supplied with the line image B1. The line supplied with neither the line image B1 nor the line image B2 has higher luminance than the lines supplied with either the line image B1 or the line image B2, because the period of the time during which the light scattering degree of the pixels Pix is equal to or greater than a predetermined value due to the potential applied thereto at the reset timing WS is longer than that of the line supplied with either the line image B1 or the line image B2. In this manner, the light scattering period of the line relatively further away from the light source 11 during the luminance correction period FI4 is caused to be longer than the light scattering period of the line relatively closer to the light source 11 during the luminance correction period FI4, it is possible to cause the total luminance of the line relatively further away from the light source 11 during the luminance correction period FI4 to be higher than the total luminance of the line relatively closer to the light source 11 during the luminance correction period FI4. Thus, in the second embodiment also, in a manner similar to the first embodiment, it is possible to correct, during the luminance correction period FI4 (for example, see the curve E in FIG. 3), the luminance difference (for example, see the curve D in FIG. 3) caused by the relative difference in distance of the lines from the light source 11 in the image display period, thereby reducing the luminance difference. To set the light scattering degree to be equal to or greater than a predetermined value, for example, a voltage corresponding to the maximum gradation of the pixel signal is supplied to the pixels Pix.

In the second embodiment also, the same line image is written to two or more lines at a certain timing during the luminance correction period FI4. More specifically, as illustrated in FIG. 5, after the supply of the line image B1, the line image B2 is supplied to the pixels Pix of the two lines to which the line images R5, G5, and B5 and the line images R6, G6, and B6 are supplied during the image display period. The line image B2 is then held until the end of the luminance correction period FI4. The driving signal, which is output from the scanning circuit 9 in writing the line image 32, is applied to the scanning lines 5 of the two lines at the same timing. As described above, unless otherwise specified, the second embodiment is the same as the first embodiment.

With the second embodiment, it is possible to obtain the same advantages as those of the first embodiment.

Third Embodiment

Hereinafter, a display device of a third embodiment will be described in detail with reference to FIG. 6. In the description of the third embodiment, the same components as those in the second embodiment are denoted by the same reference numerals, and the description thereof will be omitted.

Figure 6:
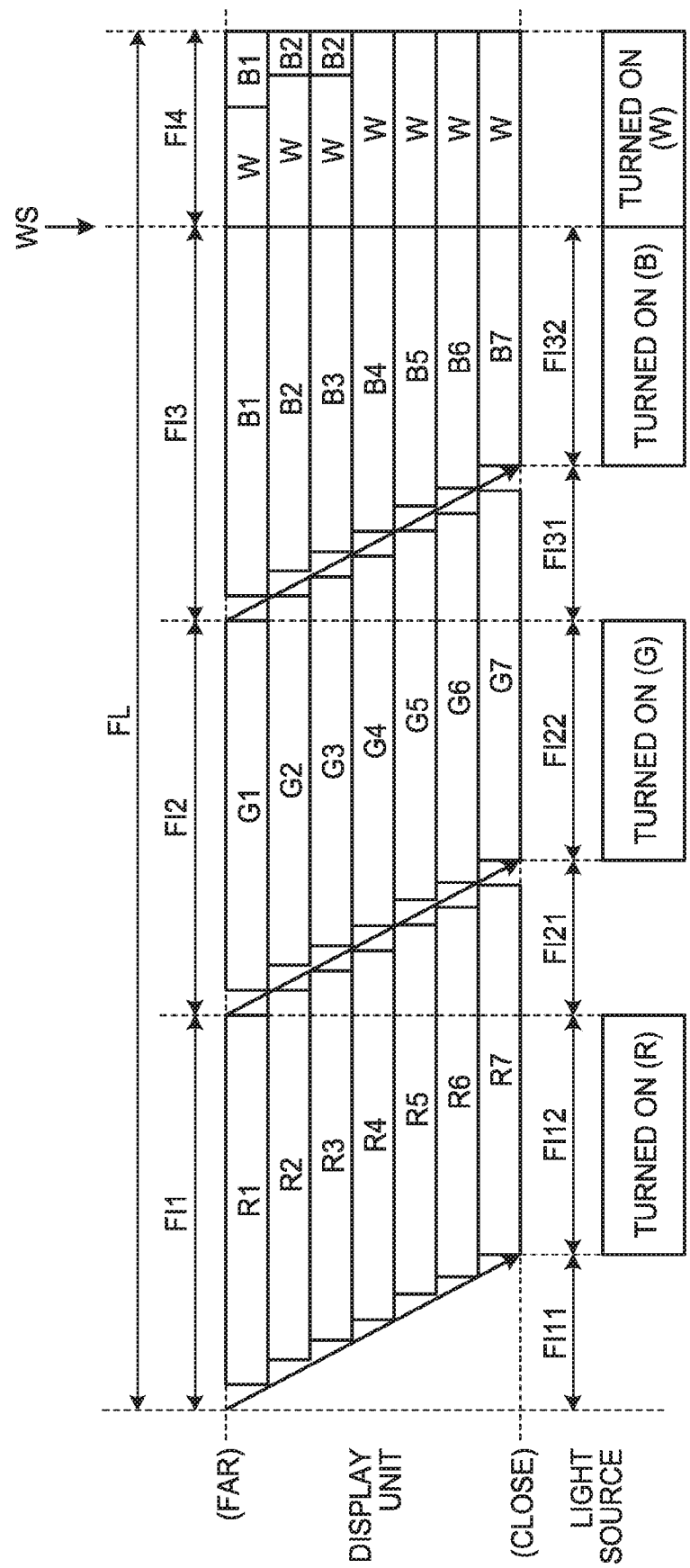
FIG. 6 is a time chart illustrating an example of a field sequential control in a third embodiment.

FIG. 6 is a time chart illustrating an example of a field sequential control in the third embodiment. In the first embodiment and the second embodiment, the driving signal is output from the scanning circuit 9 to the scanning lines 5 during the writing periods FI11, FI21, and FI31 such that the scanning lines 5 are sequentially scanned from the side further away from the light source 11 toward the side closer to the light source 11. In the third embodiment, as illustrated in FIG. 6, the driving signal is output from the scanning circuit 9 to the scanning lines 5 during the writing periods FI11, FI21, and FI31 such that the scanning lines 5 are sequentially scanned from the side closer to the light source 11 toward the side further away from the light source 11.

During the luminance correction period FI4, the luminance at the side further away from the light source 11 is caused to be higher than the luminance at the side closer to the light source 11. Thus, in the third embodiment, unlike the second embodiment, the line supplied with the line image B1 is the pixels Pix supplied with the line images R1, G1, and 31 during the image display period and coupled to the scanning line 5 located closer to the light source 11. The lines supplied with the line image B2 are the pixels Pix supplied with the line images R2, G2, and B2, and the pixels Pix supplied with the line images R3, G3, and B3 during the image display period. As described above, unless otherwise specified, the third embodiment is the same as the second embodiment.

In the third embodiment, the scanning direction during the image display period is a direction from the side closer to the light source 11 (scanning line 5a side) toward the side further away from the light source 11 (scanning line 5b side). A timing (reset timing WS) at which the scattering degree of the liquid crystal 3 is set to be equal to or greater than a predetermined value is provided between the image display period and the luminance correction period FI4. A reset sequence for resetting the scattering degree of the liquid crystal to be equal to or less than a predetermined value after the timing, is a sequence from the one side surface side toward the opposite side of the one side surface. Consequently, by the reset sequence, it is possible to control the display panel (liquid crystal display panel P) during the luminance correction period FI4 such that the light scattering time of the liquid crystal is increased with decreasing distance from the opposite side of the one side surface. It is also possible to cause the scanning direction during the writing periods FI11, FI21, and FI31 in the image display period to be the same as the scanning direction during the writing period in the luminance correction period FI4. Thus, with a simple control, it is possible to reduce the nonuniformity of the luminance distribution of an image due to the positional relation between the display panel and the light source 11. For example, to set the light scattering degree to be equal to or greater than a predetermined value, a voltage corresponding to the maximum gradation of the pixel signal is supplied to the pixels Pix.

Modification

Hereinafter, with reference to FIG. 7 and FIG. 9, a modification of the first embodiment will be described. In the description of the modification, the same reference numerals denote the same components as those in the first embodiment, and the description thereof will be omitted.

First Modification

Figure 7:
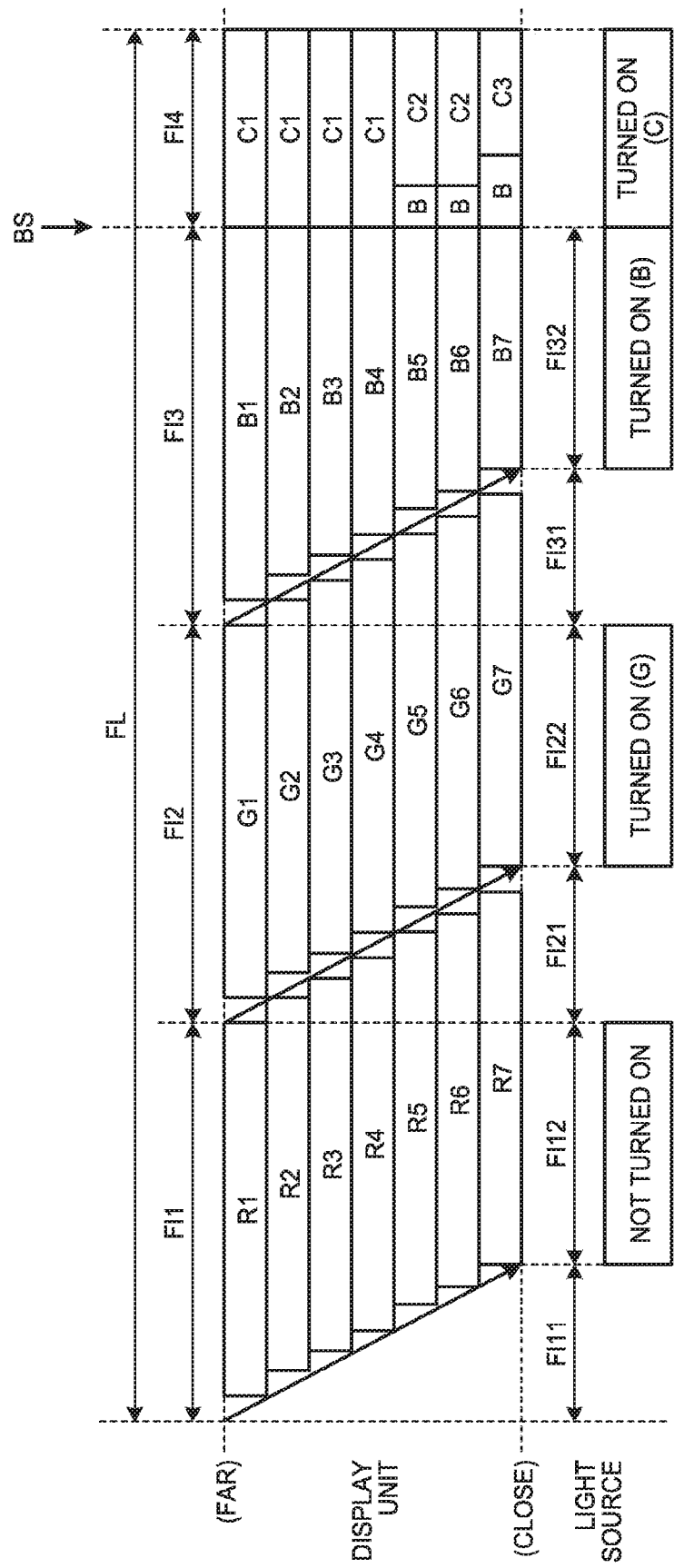
FIG. 7 is a time chart illustrating an example of a field sequential control in a first modification.

FIG. 7 is a time chart illustrating an example of a field sequential control in the first modification. In the example illustrated in FIG. 7, unlike FIG. 4 referred to in the first embodiment, the first light source HR is not turned ON during the holding period FI12. In other words, in the first modification, the light source device L is controlled such that the light sources of two colors (for example, the second light source 11G and the third light source 11B are turned ON.

When the light source device L is controlled such that two colors are turned ON as in the first modification, the light emitted to the display unit 7 during the luminance correction period FI4 is a synthetic light of light, in two colors. In the example illustrated in FIG. 7, the second light source 11G and the third light source 11B are turned ON during the image display period. Thus, by turning ON the second light source 13G and the third light source 11B during the luminance correction period FI4, the light source device L emits cyan (C) light as a synthetic light of green (G) light and blue (B) light.

There is no difference between the first modification and the first embodiment in that the reset timing BS is provided between the field period FI3 and the luminance correction period FI4, and in that a gradation signal is controlled during the luminance correction period FI4. More specifically, although FIG. 4 illustrates the line image W1, the line image W2, and the line image W3 as the gradation signals of the lines in the luminance correction period FI4 whereas FIG. 7 illustrates a line image C1, a line image C2, and a line image C3 as the gradation signals of the lines in the luminance correction period FI4; this difference does not indicate that, a way of controlling the gradation signal is changed but indicates that the pixels Pix scatter the cyan (C) light instead of the white color light because the light emitted during the luminance correction period FI4 is changed from the white color light to the cyan (C) light. The control of the gradation signals for supplying the line image C1, the line image C2, and the line image C3 to the pixels Pix is similar to the control of the gradation signals for supplying the line image W1, the line image W2, and the line image W3 to the pixels Pix.

Second Modification

Figure 8:
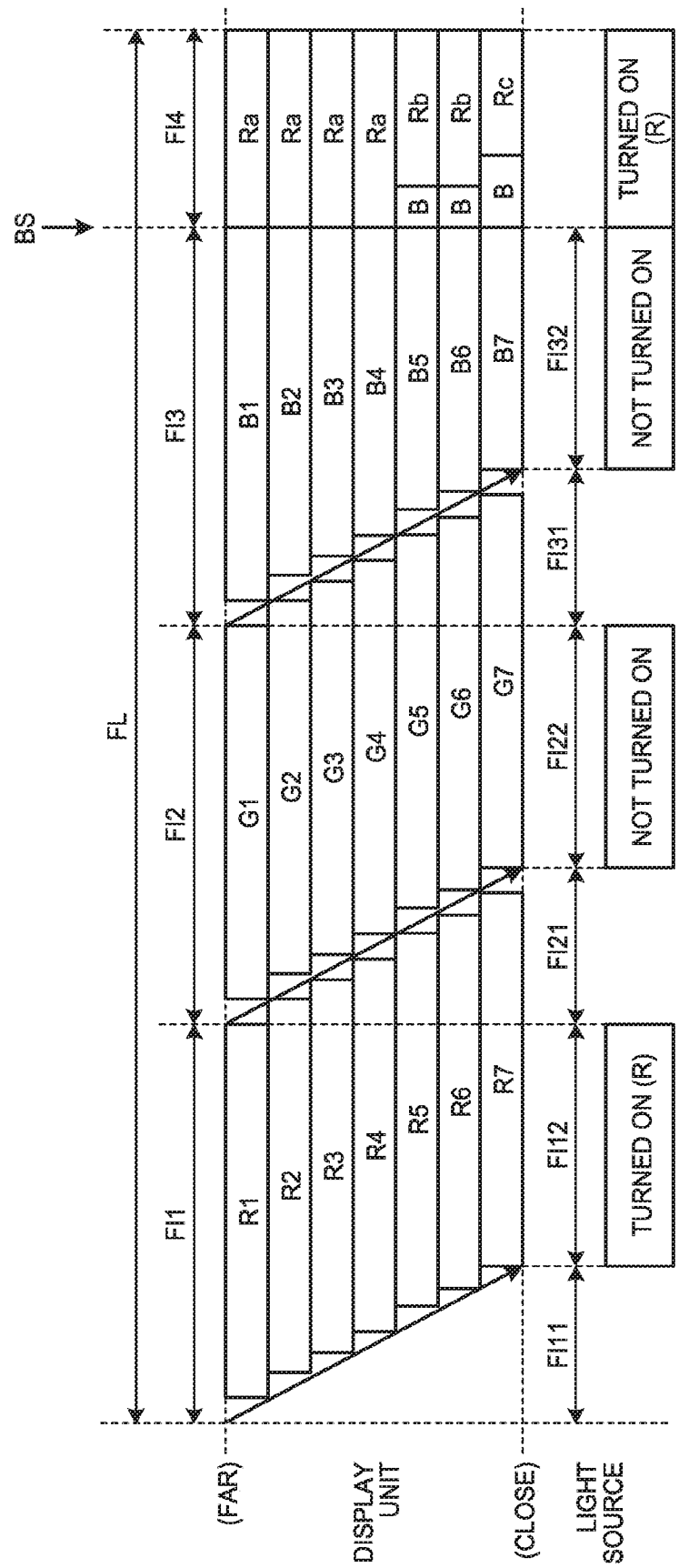
FIG. 8 is a time chart illustrating an example of a field sequential control in a second modification.
Figure 9:
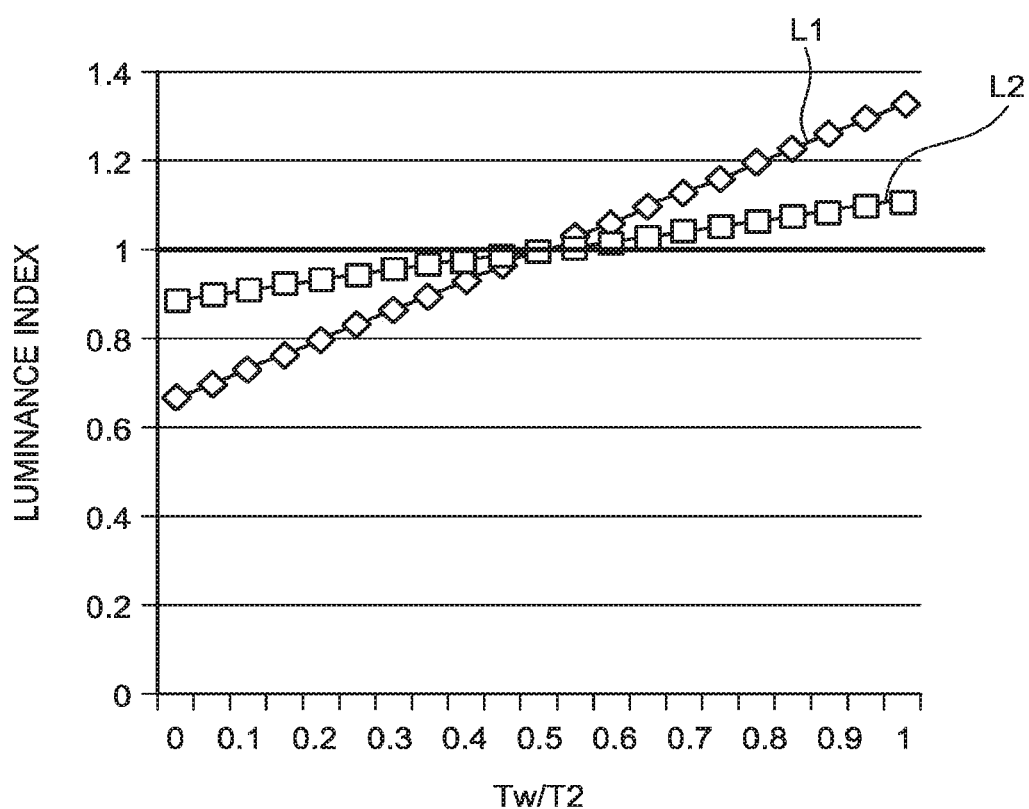
FIG. 9 is a graph illustrating an example of a correspondence relation between a parameter (Tw/T2) relating to a lighting time of a light source during a luminance correction period and a luminance index of the display unit.

FIG. 9 is a time chart illustrating an example of a field sequential control in a second modification. In the example illustrated in FIG. 8, unlike FIG. A referred to in the first embodiment, the second light source 11G and the third light source 11B are not turned ON during the holding period FI12. In other words, in the second modification, the light source device L is controlled such that the light source of a single color (for example, the first light source HR) is turned ON.

When the light source device L is controlled such that a single color is turned ON as in the second modification, light emitted to the display unit 7 during the luminance correction period FI4 is light in the single color. In the example illustrated in FIG. 8, the first light source 11R is turned ON during the image display period. Thus, the light source device L turns ON the first light source 11R during the luminance correction period FI4.

There is no difference between the second modification and the first embodiment in that the reset timing BS is provided between the field period FI3 and the luminance correction period FI4, and in that a gradation signal is controlled during the luminance correction period FI4. More specifically, FIG. 4 illustrates the line image W1, the line image W2, and the line image W3 as the gradation signals of the lines in the luminance correction period FI4 whereas FIG. 8 illustrates a line image Ra, a line image Rb, and a line image Rc as the gradation signals of the lines in the luminance correction period FI4; this difference does not indicate that a way of controlling the gradation signal is changed, but indicates that the pixels Pix scatter the red (R) light instead of the white color light because the light emitted during the luminance correction period FI4 is changed from the white color light to the red (R) light. The control of the gradation signals for supplying the line image Ra, the line image Rb, and the line image Rc to the pixels Pix is similar to the control of the gradation signals for supplying the line image W1, the line image W2, and the line image W3 to the pixels Pix.

The light in two colors in the first modification is not limited to the green (G) light and the blue (B) light. For example, if the light in two colors is the red (R) light and the green (G) light, the synthetic light is yellow (Y). If the light of two colors are the red (R) light and the blue (B) light, the synthetic light is magenta (M). The light of a single color in the second modification is not limited to red (R) and may also be another color. For example, the light of a single color in the second modification may be white color light.

The color of the light emitted from the light source 11 is not limited to red (R), green (G), blue (B), or a synthetic color of red (R), green (G), and blue (B). In other words, the colors of the light emitted from the light emitting elements that make up the light source 11 included in the light device L may be changed to other colors. The colors of the light that can be emitted from the light emitting elements that make up the light source 11 is not limited to three colors (and synthetic colors of some of them or all of them) and may be two or fewer colors, or may be four or more colors.

The modification is also applicable to the second embodiment and the third embodiment. In other words, if the image display period in the second embodiment or the third embodiment is the image display period as in the first modification or the second modification, the modification is applicable to the second embodiment and the third embodiment, by replacing the light from the light source 11 during the luminance correction period FI4 in FIG. 5 and FIG. 6, to the light from the light source 11 during the luminance correction period FI4 in the first modification and the second modification.

In FIG. 7 and FIG. 8, the writing period and the holding period of a field period are provided during which the light source 11 is not turned ON. However, the field period during which the light source 11 is not turned ON may be omitted from the frame period FL. The time of the omitted field period may be assigned to a part or all of another field period, thereby extending the time of the other field period. Alternatively, the time of the frame period FL may be reduced by the length of the omitted field period.

The luminance correction period can be used not only for uniformizing the luminance distribution of the display unit 7 but also for improving the luminance of the entire display unit 7.

FIG. 9 is a graph illustrating an example of a correspondence relation between a parameter (Tw/T2) relating to a lighting time of the light source 11 during the luminance correction period FI4 and a luminance index of the display unit 7. The luminance index is a value obtained by evaluating the luminance of the entire display unit 7 relative to luminance (1) of the entire display unit 7 in a comparative example in which the luminance correction period FI4 is not provided during the frame period FL having the same time as that of each embodiment, but the entire time of the frame period FL is assigned to the image display period.

T3 is the total lighting time of the light source 11 during the holding periods FI12, FI22, and FI32 in the embodiments described with reference to FIG. 11 to FIG. 6. Tw is the lighting time of the light source 11 during the luminance correction period FI4 in the embodiments. T2 is the total lighting time of the light source 11 during the holding periods FI12, FI22, and FI32 in the comparative example. In this case, Tw and T2 are used to express T3 as in the following expression (1).

$$T3=T2-\{(\frac{1}{3})*(T1+Tw)\} \quad (1)$$

T1 is the total time of the writing periods FI11, FI21, and FI31 in the comparative example. The luminance when the first light source 11R, the second light source 11G, and the third light source 11B are all turned ON in the comparative example is expressed as 1. In this case, the total luminance L(3) of the light source 11 during the luminance correction period FI4 in the embodiments is expressed as expression (2).

$$L(3)=(T3/T2)+\{[3\times(Tw/3)]/T2\}=1-\{(T1-2Tw)/3T2\} \quad (2)$$

In expression (2), if Tw/T2 is x, expression (2) can be expressed as expression (3). In this example, if the horizontal axis expresses x=Tw/T2, and the vertical axis expresses the luminance index of the display unit 7, expression (3) can be expressed as the line L1 in the graph illustrated in FIG. 9.

$$L1:L(3)=1-\{(T1-2T2x)/3T2\} \quad (3)$$

In a similar manner to the concept of expression (1) to expression (3), luminance L(2) can be expressed by expression (4). The luminance L(2) is luminance of the light source 11 during the luminance correction period FI4 obtained when the synthetic light emitted during the luminance correction period FI4 is the synthetic light of light in two colors as in the first modification. Expression (4) can be expressed by the line L2 in the graph illustrated in FIG. 9.

$$L2:L(2)=1-\{(T1-T2x)/3T2\} \quad (4)$$

FIG. 9 is a graph when it is T1=T2=2.77 milliseconds [ms]. In FIG. 9, when x=Tw/T2 is equal to or greater than 0.5, the luminance index of the display unit 7 in the embodiments is equal to or greater than 1. Thus, by providing the luminance correction period such that Tw/T2 becomes equal to or greater than 0.5, it is possible to improve the luminance of the entire display unit 7. The value of T1 and T2 is not limited to T1=T2=2.77 milliseconds [ms] and may be modified as appropriate.

Luminance compensation may also be performed by suitably combining the first embodiment, the second embodiment, and the third embodiment. For example, a lighting amount of each of the first light source HR, the second light source 11G, and the third light source 11B that are turned ON during the luminance correction period FI4 by the light source drive circuit 12 under the control of the timing controller 13 may be substantially the same as a lighting amount of each of the first light source HR, the second light source 11G, and the third light source 11B that are turned ON during the image display period.

The light source device L may at least illuminate the liquid crystal display panel P, and the specific arrangement of the light source device L can be modified as appropriate. For example, the light source device L may be a front light. The liquid crystal display panel P is not limited to a liquid crystal display panel using the polymer-dispersed liquid crystal. For example, the liquid crystal display panel P may also be a display panel in another type such as a transmissive type/transflective type, or reflective type display panel applied with the FSC, and the like. When the liquid crystal display panel is a transmissive type display panel, the light source device L is provided at the rear surface side of the display surface.

Other functions and effects brought about by the aspect described in the present embodiment, which are apparent from the description of the present specification or can be appropriately conceived by those skilled in the art, are naturally understood to be brought about by the present invention.

What is claimed is:

1. A display device comprising:
    a display panel that includes a polymer-dispersed liquid crystal sealed between two facing substrates and is configured to display a frame image by arranging a plurality of line images in a scanning direction; and
    a light source that is configured to emit light from one side surface side of the display panel, wherein
    one frame period assigned to the frame image includes an image display period and a luminance correction period,
    a total luminance of the display panel during the luminance correction period is increased with decreasing distance from an opposite side of the one side surface side,
    the light source includes a plurality light sources corresponding to a plurality of colors, and
    among the plurality of light sources, a light source turned on in the image display period is turned on in the luminance correction period and a light source not turned on in the image display period is not turned on in the luminance correction period.

2. The display device according to claim 1, wherein in the display panel during the luminance correction period, a light scattering degree of the polymer-dispersed liquid crystal is increased with decreasing distance from the opposite side of the one side surface side.

3. The display device according to claim 1, wherein in the display panel during the luminance correction period, a light scattering time of the polymer-dispersed liquid crystal is increased with decreasing distance from the opposite side of the one side surface.

4. The display device according to claim 1, wherein
    the image display period includes a predetermined number of subframe periods corresponding to the number of colors of light from the light source,
    the subframe periods include writing periods of the line images and emitting periods during which the light from the light source is emitted, and
    the light emitted during the luminance correction period is a synthetic color of the light from the light source.

5. The display device according to claim 4, wherein
    the light source includes a first light source that emits red light, a second light source that emits green light, and a third light source that emits blue light, and
    the light emitted from the light source during the luminance correction period is white color light.

6. The display device according to claim 5, wherein a lighting amount of each of the first light source, the second light source, and the third light source that are turned ON during the luminance correction period is substantially equal to a lighting amount of each of the first light source, the second light source, and the third light source during the image display period.

7. The display device according to claim 1, wherein a reset timing for setting a light scattering degree of the polymer-dispersed liquid crystal to be equal to or less than a predetermined value is provided between the image display period and the luminance correction period.

8. The display device according to claim 7, wherein
    the scanning direction during the image display period is a direction from the opposite side toward the one side surface side, and
    a reset sequence for resetting the scattering degree of the polymer-dispersed liquid crystal to be equal to or greater than a predetermined value after the reset timing is a sequence from the opposite side toward the one side surface side.

9. The display device according to claim 8, wherein in at least a part of the display panel, the polymer-dispersed liquid crystal is controlled line by line in the resetting.

10. The display device according to claim 1, wherein
    a timing for setting a scattering degree of the polymer-dispersed liquid crystal to be equal to or greater than a predetermined value is set between the image display period and the luminance correction period, and
    a reset sequence for resetting the scattering degree of the polymer-dispersed liquid crystal to be equal to or less than a predetermined value after the timing is a sequence from the one side surface side toward the opposite side.

11. The display device according to claim 10, wherein the scanning direction during the image display period is a direction from the one side surface side toward the opposite side.

12. The display device according to claim 10, wherein in at least a part of the display panel, the polymer-dispersed liquid crystal is controlled line by line in the resetting.

13. The display device according to claim 1, wherein the total luminance of the display panel during the luminance correction period corresponds to a total lighting time during which the light source is turned on in the luminance correction period.

14. The display device according to claim 1, wherein in the luminance correction period, a number of lines to be collectively controlled is reduced with a decreasing distance from the light source is increased with an increasing distance from the light source.

\* \* \* \* \*